US008332443B2

(12) United States Patent
Plancarte et al.

(10) Patent No.: US 8,332,443 B2
(45) Date of Patent: Dec. 11, 2012

(54) MASTERLESS DISTRIBUTED BATCH SCHEDULING ENGINE

(75) Inventors: Gustavo A. Plancarte, Bothell, WA (US); Tao Wang, Issaquah, WA (US); Vijay B. Kurup, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 515 days.

(21) Appl. No.: 12/339,080

(22) Filed: Dec. 19, 2008

(65) Prior Publication Data

US 2010/0161549 A1   Jun. 24, 2010

(51) Int. Cl.
*G06F 17/30* (2006.01)
(52) U.S. Cl. ......... 707/951; 718/101; 718/106; 709/213
(58) Field of Classification Search .................. 718/101, 718/106; 395/671, 676; 707/951, 999.01, 707/999.107; 709/219
See application file for complete search history.

(56) References Cited

U.S. PATENT DOCUMENTS

| | | | |
|---|---|---|---|
| 6,397,352 B1 * | 5/2002 | Chandrasekaran et al. .... | 714/16 |
| 6,715,145 B1 | 3/2004 | Bowman-Amuah | |
| 6,738,971 B2 * | 5/2004 | Chandrasekaran et al. .. | 718/100 |
| 6,868,441 B2 | 3/2005 | Greene et al. | |
| 6,973,359 B2 | 12/2005 | Holtan et al. | |
| 7,296,039 B2 | 11/2007 | Chandrasekaran et al. | |
| 7,369,912 B2 | 5/2008 | Sherriff et al. | |
| 7,640,535 B2 * | 12/2009 | Somogyi et al. .............. | 717/119 |
| 7,712,100 B2 * | 5/2010 | Fellenstein et al. ........... | 718/104 |
| 2001/0042090 A1 * | 11/2001 | Williams ..................... | 709/102 |
| 2005/0138461 A1 * | 6/2005 | Allen et al. ................... | 714/4 |
| 2007/0219999 A1 * | 9/2007 | Richey et al. ................. | 707/8 |
| 2008/0082586 A1 | 4/2008 | Jasik et al. | |
| 2008/0163219 A1 * | 7/2008 | Marwinski .................. | 718/101 |
| 2008/0263106 A1 * | 10/2008 | Asherman et al. ............ | 707/202 |

(Continued)

FOREIGN PATENT DOCUMENTS

WO   0109791 A3   2/2001

OTHER PUBLICATIONS

Berning, et al., "Integrating Collaborative Planning and Supply Chain Optimization for the Chemical Process Industry (I)—Methodology", Retrieved at <<http://cepac.cheme.cmu.edu/pasilectures/pinto/revpaper-FT.pdf>>, Computers and Chemical Engineering 28, 2004, pp. 913-927.

(Continued)

*Primary Examiner* — Leslie Wong
(74) *Attorney, Agent, or Firm* — Microsoft Corporation

(57) ABSTRACT

A distributed, high availability scalable task execution framework that does not use a master. Each server periodically checks if there are new jobs that are scheduled to execute immediately and picks a task for execution. Multiple batch server configurations can be created and executed during a specific time period where each server can behave differently to provide improved response time to online users. Each server can be configured to execute a different number of parallel tasks during a time period, execute fewer tasks or no batch task at all, and then change server behavior to execute many tasks in parallel at a different time when there are no online users. Automatic transaction assists in task restart in the case of infrastructure failures. If infrastructure failure happens before the task completes, the transaction will be rolled back by the database automatically.

20 Claims, 7 Drawing Sheets

U.S. PATENT DOCUMENTS

2009/0193427 A1* 7/2009 Pu et al. .................... 718/104
2009/0241117 A1* 9/2009 Dasgupta et al. ............ 718/101
2011/0107341 A1* 5/2011 Longobardi et al. .......... 718/102

OTHER PUBLICATIONS

Liu, et al., "Dynamic Co-Scheduling of Distributed Computation and Replication", Retrieved at <<http://www.cs.utk.edu/~huangj/papers/co-sched.pdf>>, Nov. 30, 2005, pp. 1-8.

Chang, et al., "Bigtable: A Distributed Storage System for Structured Data", Retrieved at <<http://www.usenix.org/events/osdi06/tech/chang/chang__html/>>, Sep. 30, 2008.

Plattner, et al., "Ganymed: Scalable Replication for Transactional Web Applications", Retrieved at <<http://www.iks.inf.ethz.ch/publications/files/ganymed-mw04.pdf>>.

\* cited by examiner

MASTERLESS DISTRIBUTED BATCH SCHEDULING ENGINE

BACKGROUND

A batch framework can typically support a single task that represents a job. The framework can also execute serial tasks with the assistance of a batch journal; however, there may not be other dependency support. Additionally, tasks execution can require connecting a client and manually launching a batch engine. Other batch engines can employ a workflow style where a task that finishes executing includes the logic about what to do next.

For example, the following limitations can exist in current batch processing frameworks. The framework requires a client for processing batch jobs, and the batch cannot simply be submitted with the assumption that the job will be executed, as the job may not run if a client is not open. Moreover, the framework may not support parallelism. There can be various scenarios where a batch job that processes transactions, for example, could be broken into separate sub-jobs and executed against different batch server instances to increase throughput and reduce overall execution time. The batch framework may not allow the creation of a dependency tree for the different tasks that comprise the batch job.

When a batch task is executing, successful execution can fail due to infrastructure failures, including power outages, server crashes or connectivity issues, among other failures. When this occurs the batch engine tries to re-execute the failing task. Ultimately, the outcome of the task is desired to be the same no matter what happens to the infrastructure.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture includes a distributed highly available and scalable task execution framework that does not use a master. Each batch server knows when and how to pick the next available task. Each server periodically checks if there are new jobs that are scheduled to execute immediately and picks a task for execution. Multiple batch server configurations can be created and executed during a specific time period (e.g., a day) where each server can behave differently to provide improved response time to online users, including rich clients and web clients. To manage resources and maximize response time to users, each server can be configured to execute a different number of parallel tasks during a first period of time (e.g., day), execute fewer tasks or no batch task at all during a different time period (e.g., business hours), and then change server behavior to execute many tasks in parallel when there are a minimum or no online users (e.g., nighttime).

The outcome of a task is the same no matter the online/offline state of the infrastructure. To facilitate this result, the batch framework provides an automatic transaction option. Automatic transaction assists in task restart in the case of infrastructure failures. When enabled, the batch framework starts the database transaction and commits the transaction when the task is marked as complete. In this way, developers consuming the batch framework do not need to track the progress. If infrastructure failure happens before the task completes, the transaction will be rolled back by the database automatically.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
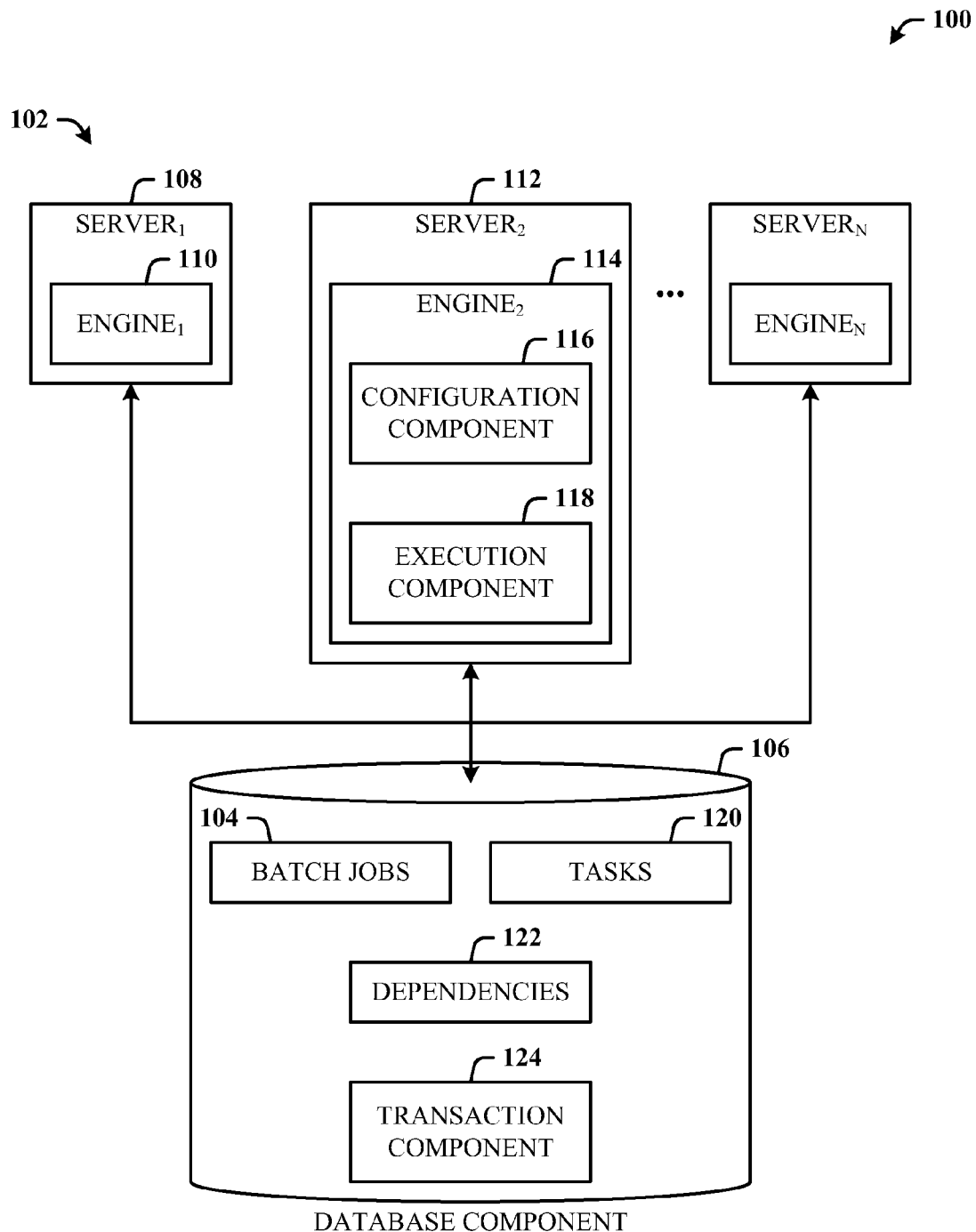
FIG. 1 illustrates a computer-implemented batch job system for masterless batch job processing.

The multiple batch server framework disclosed herein is a distributed, high availability and scalable task execution framework that does not use a master. Each server periodically checks if there are new jobs that are scheduled to execute immediately and picks a task for execution. Server configurations can be created and tasks executed during specific time periods such that servers can behave the same, differently, and in groups of similar behavior to provide improved response time to online users. Automatic transaction assists in task restart in the case of infrastructure failures.

As utilized herein, a batch job is a logical group of tasks that includes settings such as recurrence and can be saved into a batch job table. A batch task is a unit of execution that includes all information needed to run an instance of a batch class. The batch task can also have dependencies with other batch tasks within the same batch job. The same task can be in the same batch job more than once and have different dependencies. For example, a batch job to create invoices from sales orders can include multiple tasks such as getting updated vendor data from an external feed, getting updated sales data from an external feed, creating the invoices using the data, etc. The batch task is saved into the batch table. A batch server is a server that can obtain and execute batch tasks and process dependencies.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented batch job system 100. The system 100 can include a batch job engine (denoted as the entirety of $Engine_1$, $Engine_2$, ..., $Engine_N$) distributed across batch servers 102 for processing batch jobs 104. Each server of the batch servers 102 includes its own engine for interacting with the engines of the other batch servers and a database component 106. For example, a first server 108 includes a first batch job engine 110, a second server 112 includes a second batch job engine 114, and so on.

Each engine (e.g., $Engine_1$, $Engine_2$) operates independently, and includes a configuration component 116 for configuring task execution behavior of the batch server (e.g., server 112) according to configuration data, and an execution component 118 for selecting a task to execute and executing the task according to the configuration data. The database component 106 (e.g., a database system) is employed for storing the batch jobs 104 for execution, tasks 120, and task dependencies 122, and one or more tables, which will be described herein below.

The system 100 can further comprise a transaction component 124 for starting a database transaction for execution of a task and committing the transaction when the task is marked as complete. The transaction component 124 facilitates the roll back of the transaction due to a failure that occurs before the transaction is complete.

Each batch server includes logic (e.g., in the associated engine) for accessing the tasks 120, determining dependencies 122 associated with the tasks 120, and obtaining scheduling rules associated with the tasks 120. The logic facilitates redundant batch processing in case of server failure. Each server behaves differently according to respective configuration data to provide optimum service to online users, and each server can be configured to execute a different number of parallel tasks during a predetermined time period (e.g., business hours, after hours, etc.). The batch job engine and database component 106 can be employed in an enterprise resource planning (ERP) framework, for example.

Put another way, the batch job system 100 includes the batch job engine distributed across the batch servers 102 for processing the 104 batch jobs, job tasks 120, and task dependencies 122. Each batch server includes the configuration component 116 for configuring task execution behavior of the batch server according to configuration data that defines execution of tasks in parallel during a predetermined time period (e.g., day, half-day, etc.), and the execution component 118 for selecting a task to execute and executing the task according to the configuration data. The system 100 includes a database (the database component 106) for storing the batch jobs 104 and associated tasks 120 and dependencies 122 for execution.

The batch job engine can be part of an ERP framework and each server behaves differently according to respective configuration data to provide optimum service to online users (e.g., rich clients, web clients, etc.). Moreover, each of the batch servers 102 can be selectively disabled from executing batch jobs, and re-enabled for batch processing.

The transaction component 124 starts a database transaction for execution of a task and commits the transaction when the task is marked as complete. The transaction component 124 also facilitates roll back of the transaction due to a failure that occurs before the transaction is complete. The database stores the batch jobs 104, tasks 120, and task dependencies 122, and each of the batch servers 102 can access the batch jobs 104, tasks 120, and task dependencies 122. Additionally, each batch server includes logic for accessing the tasks 120, determining dependencies 122 associated with the tasks 120, and obtaining scheduling rules associated with the tasks 120.

Figure 2:
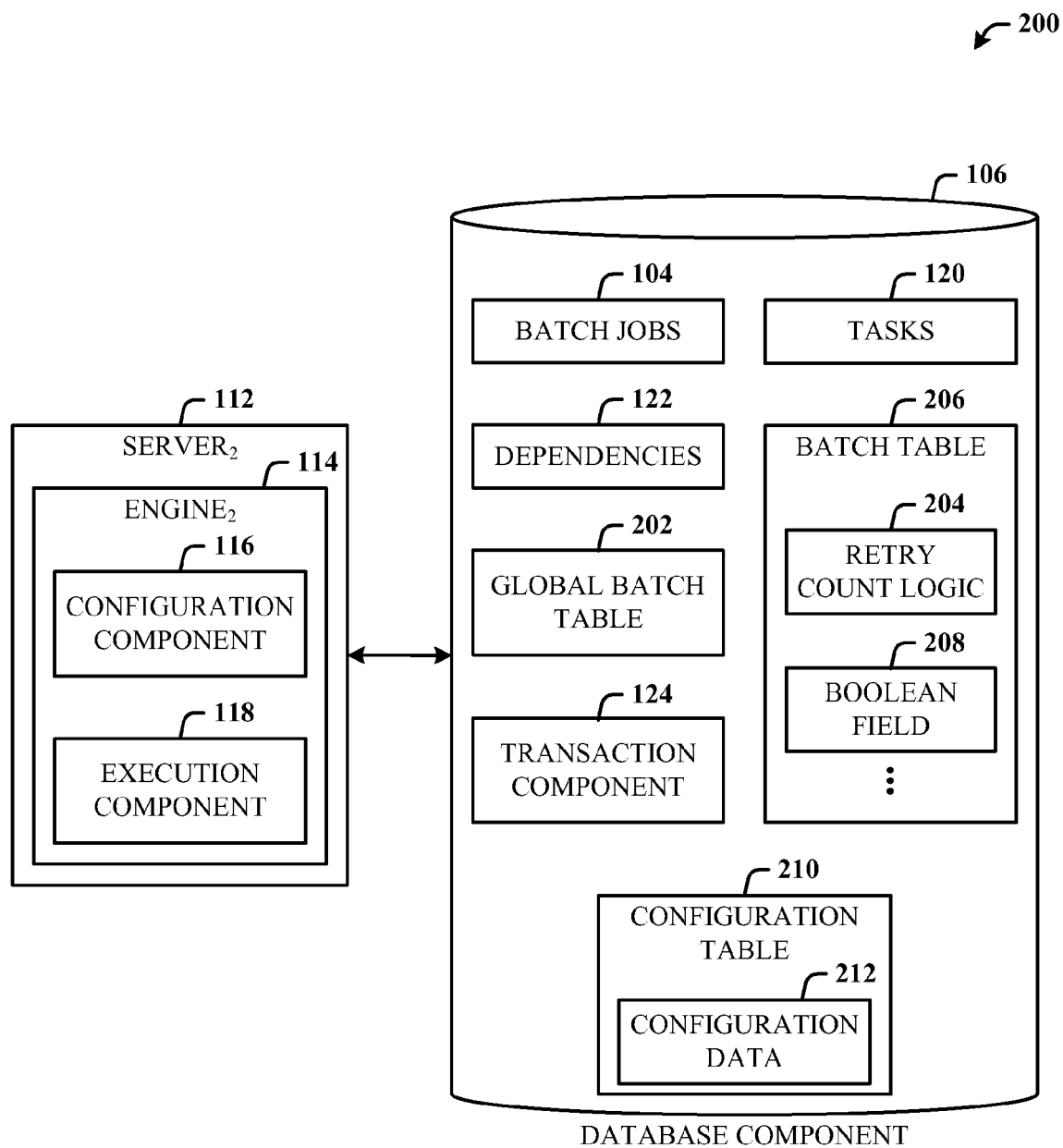
FIG. 2 illustrates a system where one or more tables can be stored in the database component in support of batch job processing.

FIG. 2 illustrates a system 200 where one or more tables can be stored in the database component 106 in support of batch job processing. The batch jobs 104, tasks 120, and associated dependencies 122 are saved into the database component 106 such that each batch server can select tasks and determine the associated dependencies and scheduling rules. Thus, if a batch server goes offline, any other batch server can continue execution of batch tasks.

There can be at least two main steps in the batch job execution. A first step is determining when a batch job is ready to run based on recurrence and batch job tasks based on the associated dependencies. A second step can include the actual execution of the tasks (e.g., where the business logic is run).

Since all of the batch servers have the same logic to process the jobs 104, tasks 120 and task dependencies 122, the batch servers could attempt to access the database concurrently or within a very short period of time of each other, thereby causing deadlocks and performance degradation.

To avoid this problem a global batch table 202 can be employed. The database component 106 includes the global batch table 202 for tracking and storing status information related to when a server last processed a batch job and task dependencies. More specifically, the global batch table 202 includes the date and time when a batch server last processed batch jobs and dependencies. All batch servers check this date/time value, and if no more than a predetermined time duration (e.g., a minute) has passed, the check result will return with no action. This capability facilitates adding more servers without stressing the batch-related tables.

Once dependencies 122 have been processed and there are tasks 120 ready to run, one or more of the batch servers pick the tasks and dependencies one-by-one using a pessimistic lock (UPDLOCK in SQL Server) with READPAST (in SQL Server) to pick up the next task that has not been locked by any other thread. Update lock (UPDLOCK) allows only one transaction at a time to update a resource to prevent deadlocks due to concurrent attempts to obtain an exclusive lock. READPAST skips locked rows in the table. Thus, a transaction skips over rows locked by other transactions.

When a batch server is executing tasks, infrastructure problems such as a power outage, server crash, and/or other network connectivity issues can occur. The batch framework recovers from these situations by adding retry count logic 204 into each of the task 120 (by default, e.g., the maximum number of retries can be set to one). When a server picks up a task for execution, the server appends a sessionID in the database component 106. If a server crashes and session manager recovery logic engages to detect dead sessions, then the batch framework logic runs to search for any task that has an invalid sessionID assigned for execution. If the maximum number of retries has not been reached, the task's status is reset to Ready, to be picked up by any available batch server.

On the other hand, if the maximum retries has been reached, the task's status is changed to Error. The maximum number of retries is designed to prevent a bug in the task logic or system from bringing down the server repeatedly. Furthermore, if a recurrent batch job has any task that has reached the retries limit the recurrence information will not be honored.

A task can undesirably run more than once due to unforeseen circumstances. Thus, in order to address this situation, the work done is tracked or execution is inside a single transaction that commits after the batch framework changes the task status to Finished (success). To enable this last scenario, a batch table 206 is employed where each of the batch tasks 120 is associated with an automatic transaction Boolean field 208 which when set, the transaction is started by the batch framework just before invoking the task, and the transaction is committed after the status is set to finished. In case of an error, the transaction can be automatically aborted. As depicted, the batch table 206 can store the retry count logic, the Boolean field for the automatic transaction, and other data related to a task.

As previously indicated, a batch server can be configured to execute a different number of parallel tasks during a specified time period (e.g., day). For example, the server can have only three threads available from 9 AM to 5 PM (e.g., regular business hours), but ten threads from 5 PM to 9 AM (overnight or after hours) to allow more throughput when users are not online.

Configuration data 212 per batch server can be saved in the database component 106 as a configuration table 210, and includes the number of threads, start time, and end time. Additionally, an administrator can disable batch execution completely on a batch server and re-enable the server for batch job processing.

Each server reads can read its configuration data 212 regularly (e.g., every five minutes) to detect if an administrator has made changes or if the server is to execute a different number of threads based on the time of day, for example.

The schema employed in the database component 106 can include the batch table 206 that represents batch tasks, and the following field is used to enable automatic transaction on the task: AutomaticTransaction: type Boolean.

The batch global table 202 is used to avoid having multiple batch server instances processing job recurrence or detecting if all the job's possible tasks have executed:
 Name: type string
 LastProcFinishedJobs: type date/time
 SessionIDx: type sessionID.

The batch server configuration table 210 is used to store the multiple batch server configuration datasets during a day, for example:
 ServerID: type serverID(string)
 MaxBatchSessions: type BatchSessions(int)
 StartTime: type timeOfDay
 EndTime: type timeOfDay Following are additional details about batch server and job processing. The background thread for batch processing will periodically monitor the database component 106 for new tasks to run. When a specific batch server finds a new task, the server will spawn a new thread, which will create a free-of-charge session and initiate a call to start the batch run. If the run completes without exception, the task is set as Finished: if there is an exception, the task status is set to Error, except if the exception is a break caused by a terminate session request, in which case the status is Canceled.

The query to select the next task is to select the next task in a waiting state. When a task finishes running the server verifies if there are more tasks waiting to run; if not, the server will set the job status to Finished, Error, or Canceled. To determine the status of the whole batch job each task has a flag that when set ignores the task on failure. A task so flagged will not affect the overall status of the job. If the flag is false (default) and the task fails, the whole job will be set to Error.

Just as in session management, there can be cases where a batch server is running batch tasks and due to a power failure, crash, or other cause, these tasks are left orphan. To address this issue, on server startup, the server updates the status of tasks previously assigned to this server instance to Error. Active batch server instances check for other dead instances and release their sessions. Additionally, incomplete batch task statuses are cleaned.

Each task can have a retry-on-failure option. The batch server will re-execute these tasks n times if the previous run failed due to infrastructure problems (server crash included). After n attempts, if it is not possible to complete the task, the task is marked as Failed and the run will continue at the next task according to a dependency tree.

A server configuration utility allows an administrator to set a server as batch server, and if so, to apply exception periods. For example, an administrator can choose to have a specific server to be batch server except between 8 AM and 5 PM because users are expected to be online doing transactions.

To begin running tasks, the background thread first checks if it is batchable and not between the exception hours. In the server configuration data 212 it is possible to specify the maximum number of batch tasks to run in parallel (e.g., four by default). The server tracks how many tasks it is currently running and, combined with the exception times, decides if the server can start a new task.

The steps to start a new task include the following. Get the task from the database by running a query. Change the batch job and task status to Executing. Start a thread session on the server and pass a classID and packed parameters of the task as the parameters. The thread session will start execution by instantiating a corresponding run base object and unpacking the sent parameters. When control is back to the server thread, the thread checks for any exception, and flags the task as Error or Finished. If the last task, the batch job status will be updated. A batch job has ended if the job does not have any task with status Executing and there are no pending tasks. This is followed by cleanup, destruction of the session and thread, and then return.

An API can be provided that introduces a class to represent a batch job. The class includes a set of tasks and dependencies between the tasks. This batch job also manages the saving and retrieving from the database. A batch job can include several instances of the same class and are treated as a different task. The different tasks can depend on each other.

Concurrent threads can save the same job. This is employed in scenarios where tasks add more tasks to the same job. To prevent loops with the use of dependencies, the following saving order will be used: Delete Dependencies, Delete Tasks, Add Tasks, Add Dependencies, and then Update Tasks.

When a new dependency is added between tasks, a check for loops is performed done to prevent a deadlock (a situation where a job cannot continue running because two tasks depend on each other in order to proceed).

When a job is canceled, the job has its status changed to Canceled, and currently executing tasks are interrupted and set to Failed. No other task in the job will run until the recurrence date/time is reached, if this option was set.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 3:
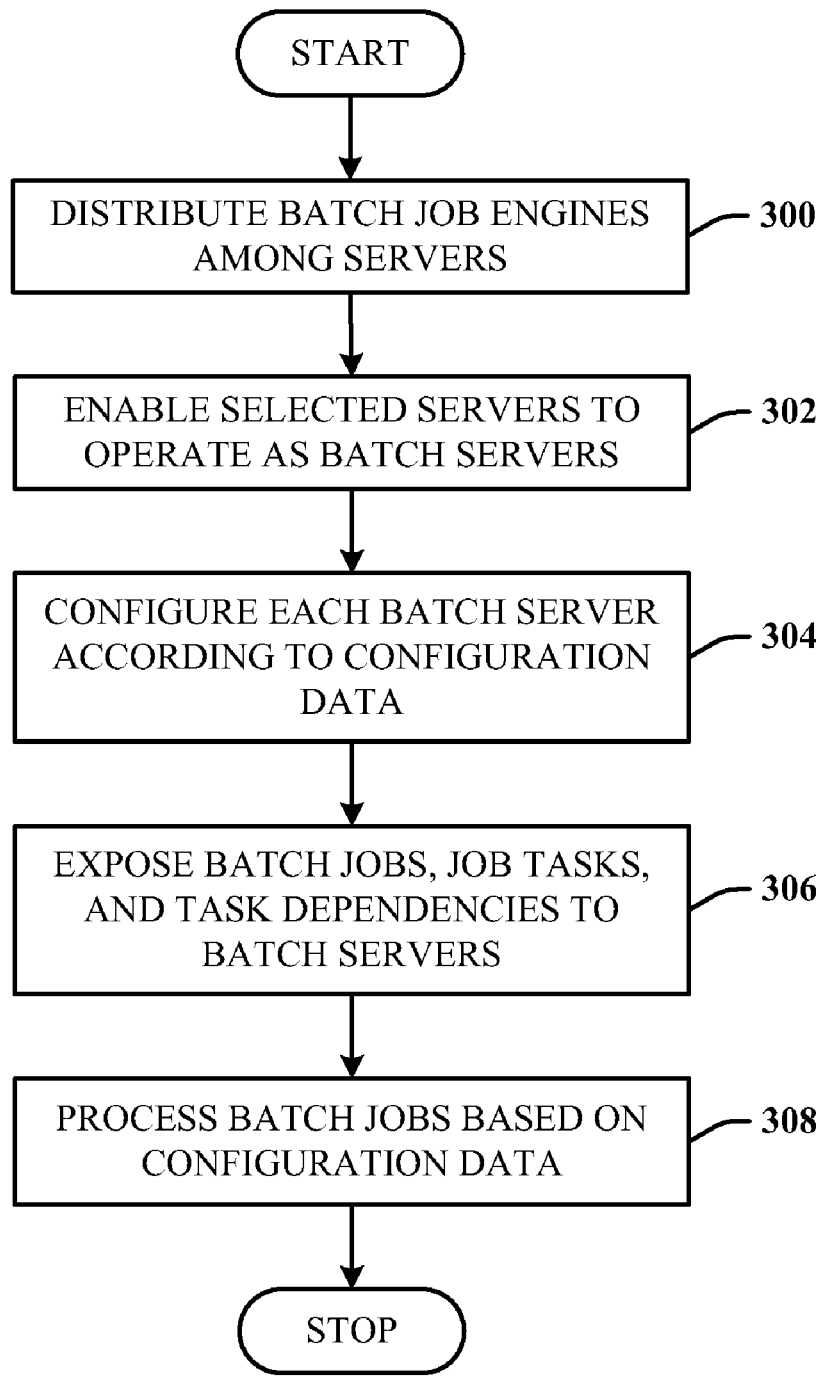
FIG. 3 illustrates a batch job processing method.

FIG. 3 illustrates a batch job processing method. At 300, batch job engines are distributed and installed on servers. At 302, selected servers are enabled to operate as batch servers. At 304, each batch server is configured according to configuration data. At 306, batch jobs, job tasks, and task dependencies are exposed to the batch servers. At 308, the batch jobs are processed based on the configuration data.

The method can further comprise configuring each batch server differently for operation during a time period based on user demands, and configuring a batch server to execute a predetermined number of tasks in parallel based on an operating time period.

The method can further comprise automatically rolling back progress of a task to a previous state based on an infrastructure failure that occurs before completion of the task, restarting a task in response to a failure to complete the task.

The method can further comprise maintaining date information and time information associated with a batch server that processed a batch job and corresponding task dependencies, and preventing task execution on a database based on the date information and time information. In other words, if the last database access for batch processing with less than a predetermined time period (e.g., one minute), task selection and execution by other batch servers can be prevented.

Figure 4:
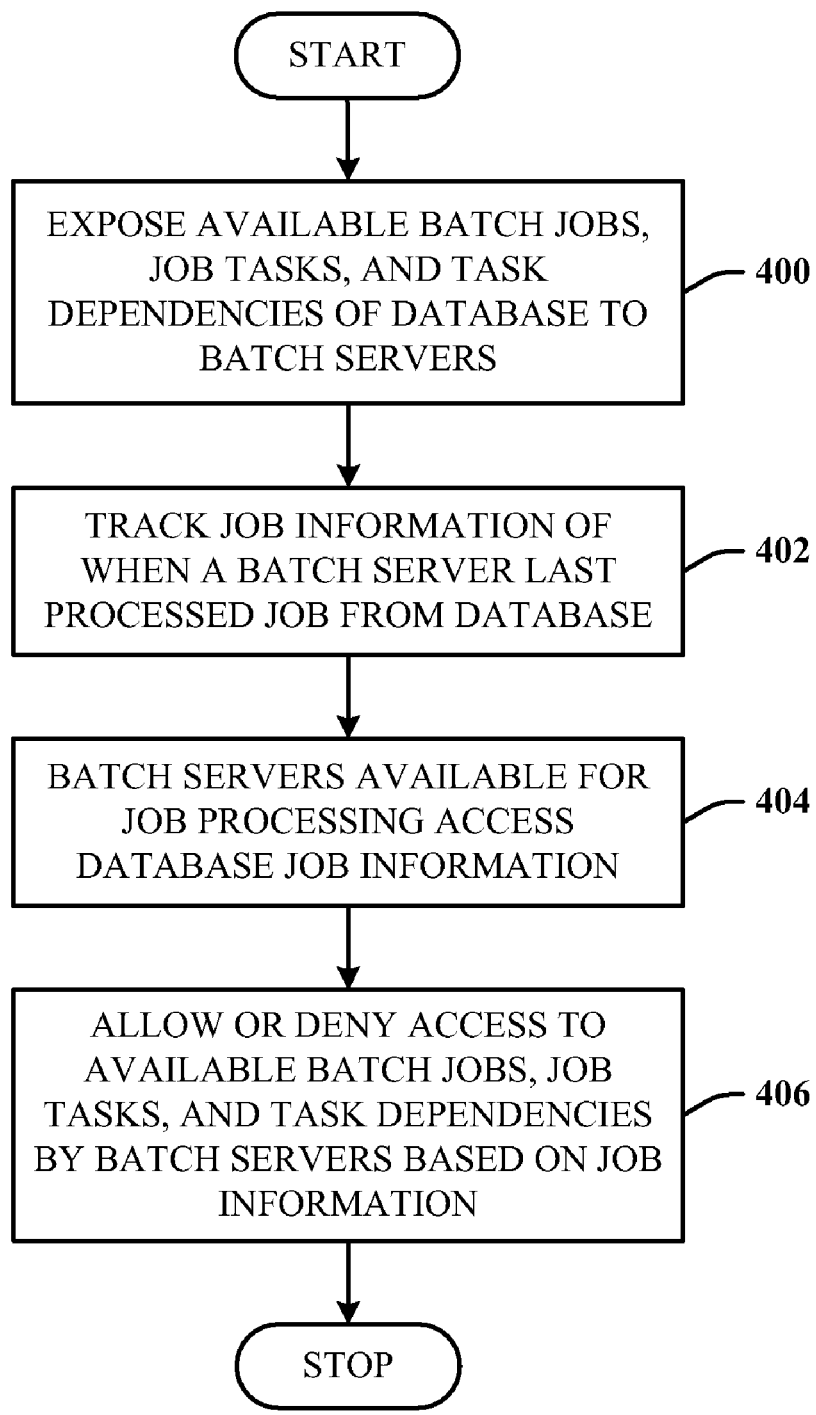
FIG. 4 illustrates a method of preventing database deadlock and performance degradation among masterless batch servers.

FIG. 4 illustrates a method of preventing database deadlock and performance degradation among masterless batch servers. At 400, available batch jobs, job tasks, and task dependencies on a database are exposed to the batch servers. At 402, job information of when a batch server last processed a job from the database is tracked. At 404, batch servers available for job processing access the database job information. At 406, a batch server is allowed or denied access to the available batch jobs, job tasks, and task dependencies based on the job information.

Figure 5:
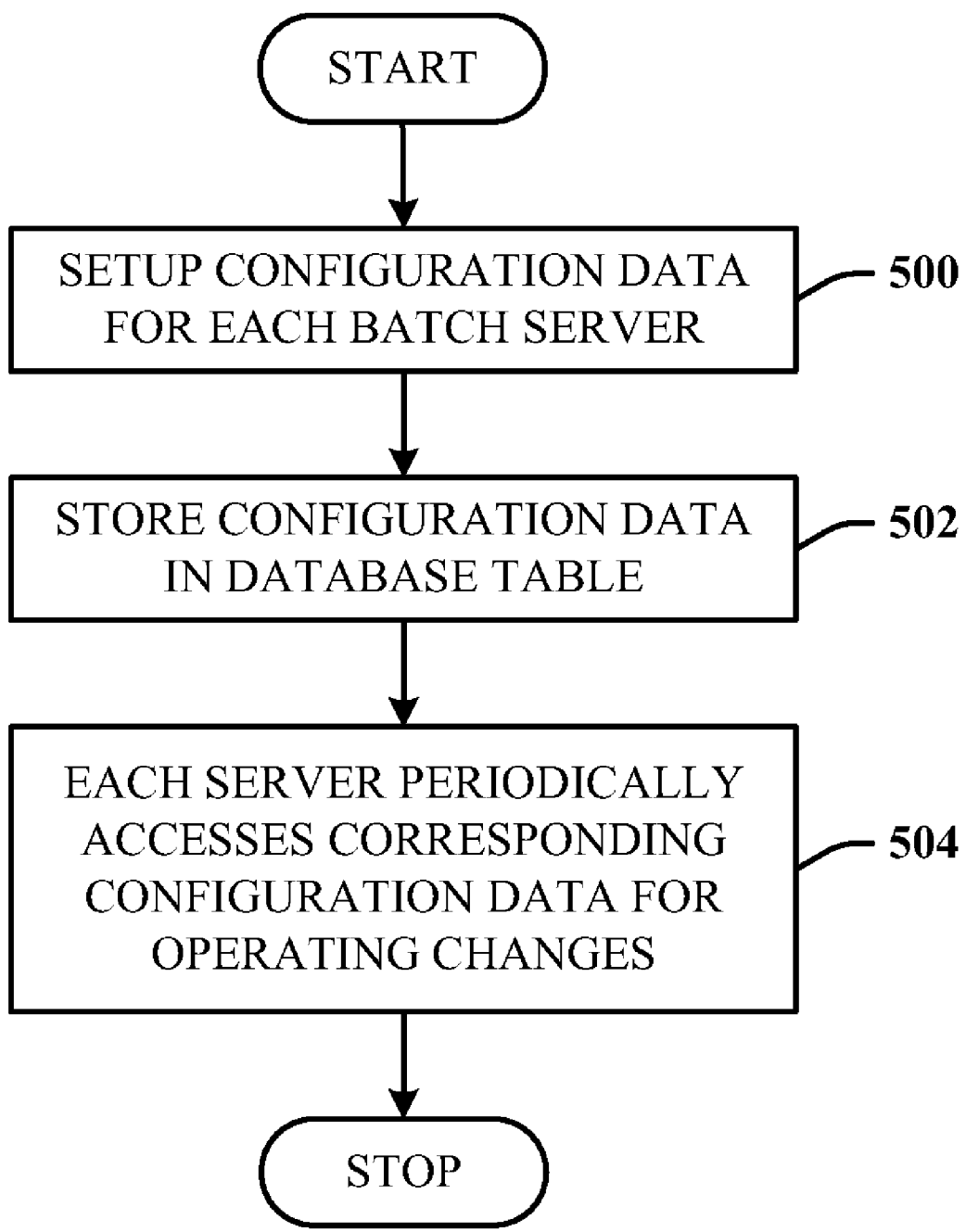
FIG. 5 illustrates a method of managing batch server configuration.

FIG. 5 illustrates a method of managing batch server configuration. At 500, configuration data for each batch server is setup. At 502, the configuration data is stored in a database table. At 504, each server periodically accesses corresponding configuration data for operational changes (e.g., number of threads, time period of day, etc.).

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 6:
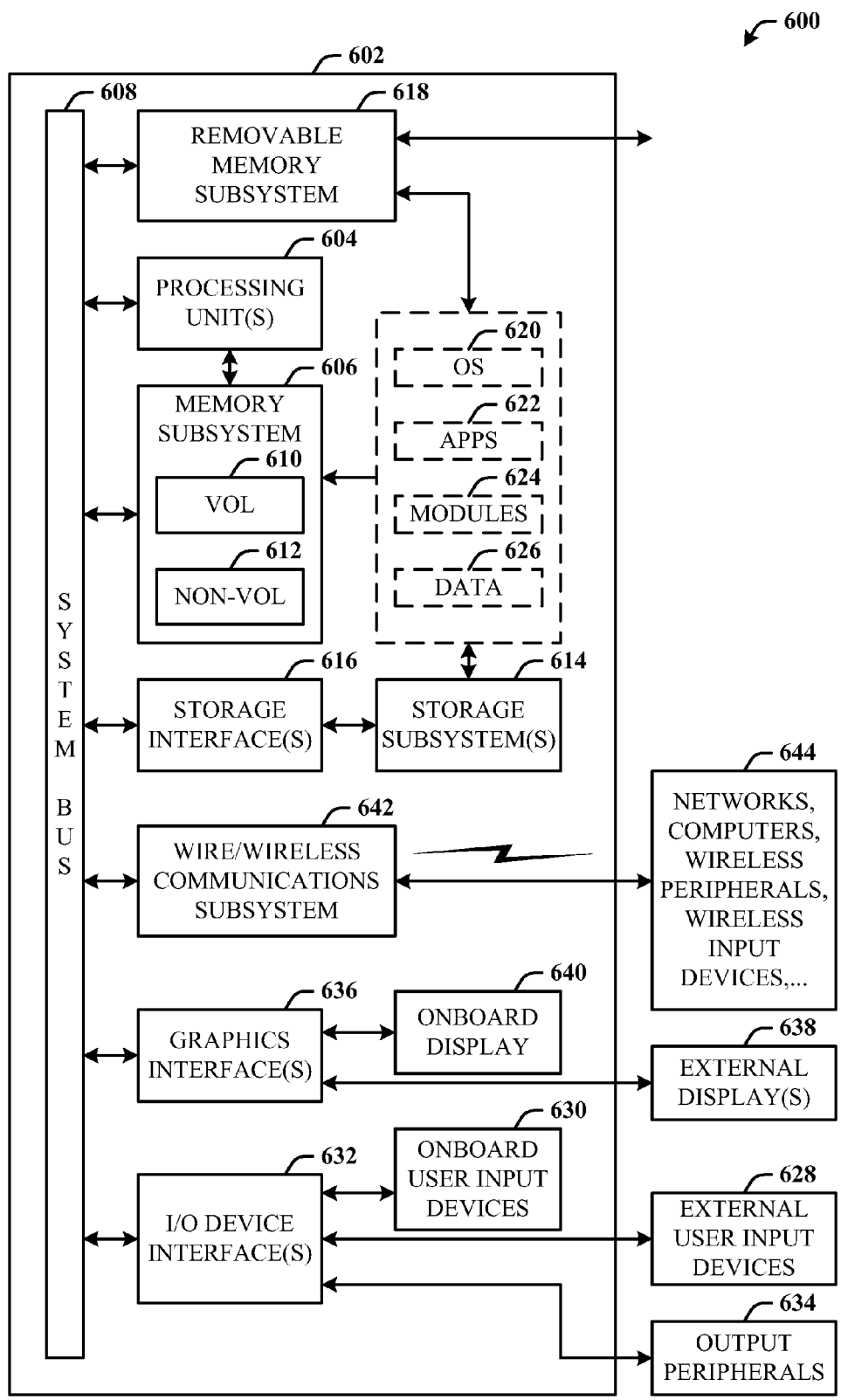
FIG. 6 illustrates a block diagram of a computing system operable as a server machine to execute masterless batch job processing in accordance with the disclosed architecture.

Referring now to FIG. 6, there is illustrated a block diagram of a computing system 600 operable as a server machine to execute masterless batch job processing in accordance with the disclosed architecture. In order to provide additional context for various aspects thereof, FIG. 6 and the following discussion are intended to provide a brief, general description of the suitable computing system 600 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 600 for implementing various aspects includes the computer 602 having processing unit(s) 604, a system memory 606, and a system bus 608. The processing unit(s) 604 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 606 can include volatile (VOL) memory 610 (e.g., random access memory (RAM)) and non-volatile memory (NON-VOL) 612 (e.g., ROM, EPROM, EEPROM, etc.). A basic input/output system (BIOS) can be stored in the non-volatile memory 612, and includes the basic routines that facilitate the communication of data and signals between components within the computer 602, such as during startup. The volatile memory 610 can also include a high-speed RAM such as static RAM for caching data.

The system bus 608 provides an interface for system components including, but not limited to, the memory subsystem 606 to the processing unit(s) 604. The system bus 608 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 602 further includes storage subsystem(s) 614 and storage interface(s) 616 for interfacing the storage subsystem(s) 614 to the system bus 608 and other desired computer components. The storage subsystem(s) 614 can include one or more of a hard disk drive (HDD), a magnetic floppy disk drive (FDD), and/or optical disk storage drive (e.g., a CD-ROM drive DVD drive), for example. The storage interface(s) 616 can include interface technologies such as EIDE, ATA, SATA, and IEEE 1394, for example.

One or more programs and data can be stored in the memory subsystem 606, a removable memory subsystem 618 (e.g., flash drive form factor technology), and/or the storage subsystem(s) 614, including an operating system 620, one or more application programs 622, other program modules 624, and program data 626. The one or more application programs 622, other program modules 624, and program data 626 can includes the servers 102 and associated components, and the database component 106 of FIG. 1, the system 200 of FIG. 2, and the methods of FIG. 3-5, for example.

Generally, programs include routines, methods, data structures, other software components, etc., that perform particular tasks or implement particular abstract data types. All or portions of the operating system 620, applications 622, modules 624, and/or data 626 can also be cached in memory such as the volatile memory 610, for example. It is to be appreciated that the disclosed architecture can be implemented with various commercially available operating systems or combinations of operating systems (e.g., as virtual machines).

The storage subsystem(s) 614 and memory subsystems (606 and 618) serve as computer readable media for volatile and non-volatile storage of data, data structures, computer-executable instructions, and so forth. Computer readable media can be any available media that can be accessed by the computer 602 and includes volatile and non-volatile media, removable and non-removable media. For the computer 602, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 602, programs, and data using external user input devices 628 such as a keyboard and a mouse. Other external user input devices 628 can include a microphone, an IR (infrared) remote control, a joystick, a game pad, camera recognition systems, a stylus pen, touch screen, gesture systems (e.g., eye movement, head movement, etc.), and/or the like. The user can interact with the computer 602, programs, and data using onboard user input devices 630 such a touchpad, microphone, keyboard, etc., where the computer 602 is a portable computer, for example. These and other input devices are connected to the processing unit(s) 604 through input/output (I/O) device interface(s) 632 via the system bus 608, but can be connected by other interfaces such as a parallel port, IEEE 1394 serial port, a game port, a USB port, an IR interface, etc. The I/O device interface(s) 632 also facilitate the use of output peripherals 634 such as printers, audio devices, camera devices, and so on, such as a sound card and/or onboard audio processing capability.

One or more graphics interface(s) 636 (also commonly referred to as a graphics processing unit (GPU)) provide graphics and video signals between the computer 602 and external display(s) 638 (e.g., LCD, plasma) and/or onboard displays 640 (e.g., for portable computer). The graphics interface(s) 636 can also be manufactured as part of the computer system board.

The computer 602 can operate in a networked environment (e.g., IP) using logical connections via a wire/wireless communications subsystem 642 to one or more networks and/or other computers. The other computers can include workstations, servers, routers, personal computers, microprocessor-based entertainment appliance, a peer device or other common network node, and typically include many or all of the elements described relative to the computer 602. The logical connections can include wire/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 602 connects to the network via a wire/wireless communication subsystem 642 (e.g., a network interface adapter, onboard transceiver subsystem, etc.) to communicate with wire/wireless networks, wire/wireless printers, wire/wireless input devices 644, and so on. The computer 602 can include a modem or has other means for establishing communications over the network. In a networked environment, programs and data relative to the computer 602 can be stored in the remote memory/storage device, as is associated with a distributed system. It will be appreciated that the network connections shown are exemplary and other means of establishing a communications link between the computers can be used.

The computer 602 is operable to communicate with wire/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 7:
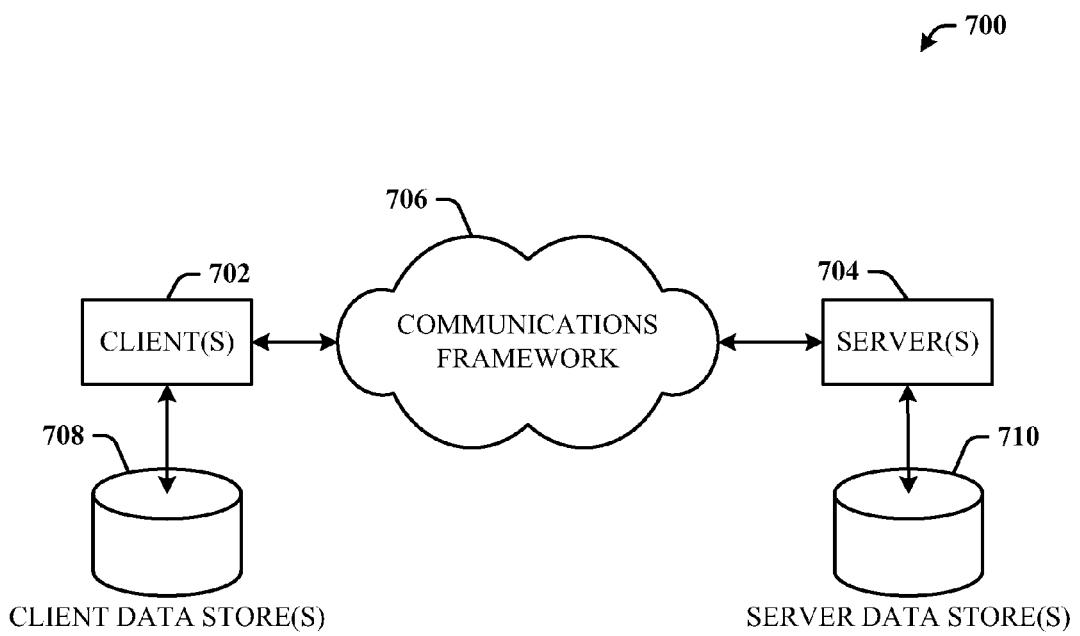
FIG. 7 illustrates a schematic block diagram of a computing environment that supports masterless batch job processing in an ERP environment.

Referring now to FIG. 7, there is illustrated a schematic block diagram of a computing environment 700 that supports masterless batch job processing in an ERP environment. The environment 700 includes one or more client(s) 702. The client(s) 702 can be hardware and/or software (e.g., threads, processes, computing devices). The client(s) 702 can house cookie(s) and/or associated contextual information, for example.

The environment 700 also includes one or more server(s) 704. The server(s) 704 can also be hardware and/or software (e.g., threads, processes, computing devices). The servers 704 can house threads to perform transformations by employing the architecture, for example. One possible communication between a client 702 and a server 704 can be in the form of a data packet adapted to be transmitted between two or more computer processes. The data packet may include a cookie and/or associated contextual information, for example. The environment 700 includes a communication framework 706 (e.g., a global communication network such as the Internet) that can be employed to facilitate communications between the client(s) 702 and the server(s) 704.

Communications can be facilitated via a wire (including optical fiber) and/or wireless technology. The client(s) 702 are operatively connected to one or more client data store(s) 708 that can be employed to store information local to the client(s) 702 (e.g., cookie(s) and/or associated contextual information). Similarly, the server(s) 704 are operatively connected to one or more server data store(s) 710 that can be employed to store information local to the servers 704.

The server(s) 704 can include the servers that receive and install the batch job engine yet do not have batch processing enabled. Once enabled, the server(s) can then be batch servers, until disabled, if desired. The server data store(s) 710 can include the data component 106 of FIG. 1.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented batch job system, comprising:
   a batch job engine distributed across batch servers for processing batch jobs, each batch server using the batch job engine for knowing when and how to select new tasks for execution from tasks available for execution, each batch server including,
      a configuration component for configuring task execution behavior of the batch server according to configuration data; and
      an execution component for selecting the new tasks to execute and executing the new tasks according to the configuration data; and
   a database component for storing at least the batch jobs and the tasks available for execution such that each batch server independently and periodically selects the new tasks for execution from the tasks available for execution, the selection of one or more new tasks by one or more batch servers being prevented on determining that a last access to the database for processing the batch jobs is less than a predetermined time duration.

2. The system of claim 1, wherein the batch job engine is part of an enterprise resource planning (ERP) framework.

3. The system of claim 1, wherein each batch server behaves differently according to respective configuration data to provide optimum service to online users.

4. The system of claim 1, wherein each batch server is configured to execute a different number of parallel tasks during a predetermined time period.

5. The system of claim 1, further comprising a transaction component for starting a database transaction for execution of a task and committing the transaction when the task is marked as complete.

6. The system of claim 5, wherein the transaction component rolls back the transaction due to a failure that occurs before the transaction is complete, the task being re-executed for a predetermined number of times to complete the task when a previous transaction failed and the status for the task is changed after re-execution of the task for the predetermined number of times.

7. The system of claim 1, wherein the database component stores the batch jobs, tasks, and task dependencies and each of the batch servers can access the batch jobs, tasks, and task dependencies.

8. The system of claim 1, wherein each batch server includes logic for accessing tasks, determining dependencies associated with the tasks, and obtaining scheduling rules associated with the tasks, the logic facilitates redundant batch processing in case of server failure.

9. A computer-implemented batch job system, comprising:
   a batch job engine distributed across batch servers for processing batch jobs, each
   batch server interacting with other batch servers for processing the batch jobs without using a master server, each batch server knowing when and how to select new tasks for execution from tasks available for execution based on the batch job engine, each batch server including,
      a configuration component for configuring task execution behavior of the batch server according to configuration data that defines execution of tasks in parallel during a predetermined time period; and
      an execution component for selecting the new tasks and executing the new tasks according to the configuration data; and
   a database for storing at least the batch jobs and tasks available to the batch servers for execution such that each batch server periodically checks the new tasks for execution and then independently selects the new tasks for execution from the tasks available to the batch servers for execution and a for preventing a new task selection when a last access to the database is less than a predetermined period of time.

10. The system of claim 9, wherein the batch job engine is part of an ERP framework and each batch server behaves differently according to respective configuration data to provide optimum service to online users.

11. The system of claim 9, wherein the database includes a global batch table that tracks and stores status information related to when a batch server last processed a batch job and task dependencies.

12. The system of claim 9, further comprising a transaction component for starting a database transaction for execution of a task and committing the transaction when the task is marked as complete, and rolling back the transaction due to a failure that occurs before the transaction is complete.

13. The system of claim 9, wherein the database stores the batch jobs, tasks, and task dependencies, each of the batch servers can access the batch jobs, tasks, and task dependencies, and each batch server includes logic for accessing the tasks, determining dependencies associated with the tasks, and obtaining scheduling rules associated with the tasks.

14. The system of claim 9, wherein one of the batch servers is disabled from executing batch jobs.

15. A computer-implemented method of processing jobs, comprising:
   distributing batch job engines among servers;
   enabling selected servers to operate as batch servers, each batch server knowing
   when and how to pick a next job task for execution from job tasks available for execution;
   configuring each batch server according to configuration data;
   exposing batch jobs, the job tasks, and task dependencies to the batch servers;
   processing the batch jobs based on the configuration data such that each batch server independently accesses the exposed batch jobs, job tasks, and task dependencies to select job tasks for execution; and
   prohibiting a job task selection by a batch server upon determining that a last batch server access is less than a predetermined period of time.

16. The method of claim 15, further comprising configuring each batch server differently for operation during a time period based on user demands.

17. The method of claim 15, further comprising restarting a task in response to a failure to complete the task.

18. The method of claim 15, further comprising configuring a batch server to execute a predetermined number of tasks in parallel based on an operating time period.

19. The method of claim 15, further comprising automatically rolling back progress of a task to a previous state based on an infrastructure failure that occurs before completion of the task.

20. The method of claim 15, further comprising: maintaining date information and time information associated with a batch server that processed a batch job and corresponding task dependencies; and preventing task execution on a database based on the date information and time information.

* * * * *